Aug. 2, 1966  H. E. DAVIS  3,264,115
SAFETY LOLLIPOP
Filed July 10, 1962
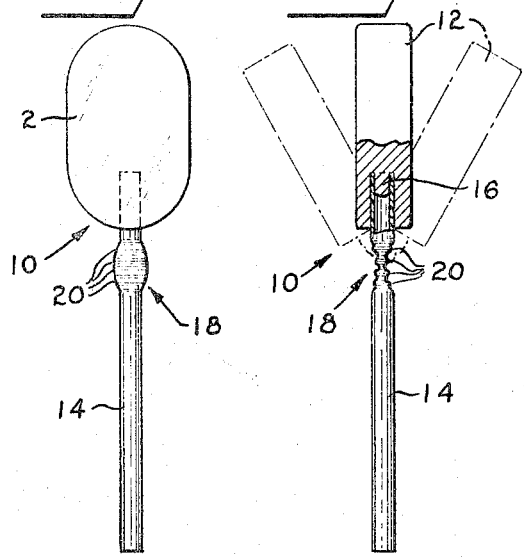
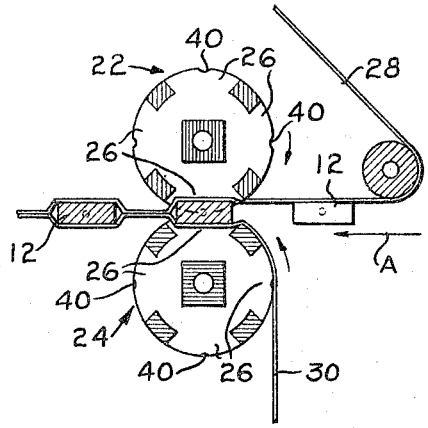
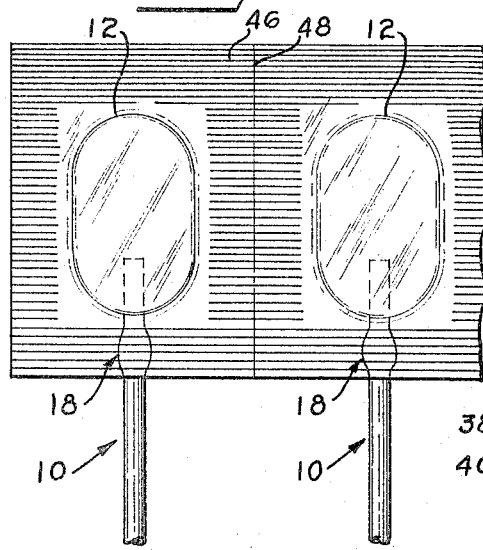
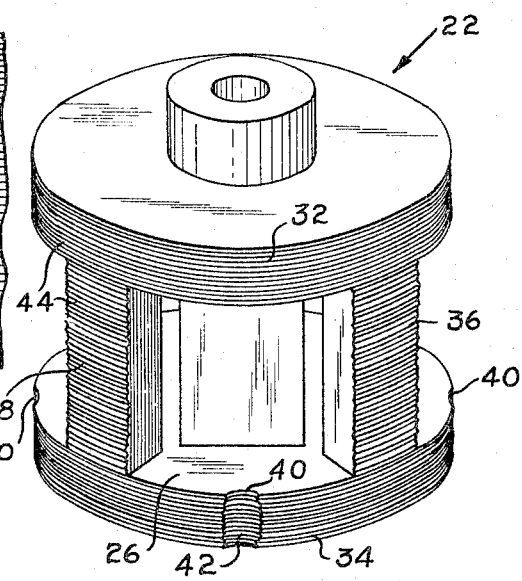
INVENTOR
HARRY E. DAVIS
BY Scrivener & Parker
ATTORNEYS

United States Patent Office 3,264,115
Patented August 2, 1966

3,264,115
SAFETY LOLLIPOP
Harry E. Davis, 510 E. Cuyahoga Falls Ave.,
Akron, Ohio
Filed July 10, 1962, Ser. No. 208,791
3 Claims. (Cl. 99—138)

This invention relates to a method of and apparatus for wrapping lollipops and more particularly to an arrangement for producing a novel wrapped lollipop provided with a safety handle.

Heretofore, lollipops and other confections of this type have been provided with wooden or other types of sticks or handles which have presented a problem of possible injury to children, due to the rigidity of the material with which the handles were formed. While various types of safety handles, capable of bending or flexing upon the application of a relatively slight endwise pressure thereto have been proposed, such handles have for the most part been insufficiently rigid to support the confection in an upright position for consumption, or have been formed of relatively expensive materials.

It is accordingly one of the objects of the present invention to provide a lollipop having a handle of relatively inexpensive material which is of such a nature as to readily flex or bend upon the application of a relatively slight endwise pressure thereto, but is also of sufficient rigidity as to support the confection in an upright position for consumption.

A further object is to provide a lollipop handle of novel construction which may be formed as a hollow tube of cellophane or other heat sealable plastic material and which is weakened in an area immediately below the supported confection to provide the safety feature above set forth.

Another object is to provide a novel method of and apparatus for wrapping lollipops of the type provided with the foregoing tubular handles which is so constituted that the weakened safety areas of the handles will be automatically formed during the wrapping of the lollipops, thus providing wrapped, safety-type lollipops in one operation.

A still further object comprehends the provision of a novel method for producing the foregoing products in a continuous manner and without the necessity of utilizing costly and complicated machinery.

The above and other objects of the invention will appear more fully hereinafter from a consideration of the following detailed description when taken in connection with the accompanying drawing which is illustrative of a preferred form of the invention. It will be expressly understood however, that the drawing is utilized for purposes of illustration only and is not to be taken as a definition of the limits of the invention, reference being had for this latter purpose to the appended claims.

In the drawing, wherein similar reference characters refer to similar parts throughout the several views;

FIG. 1 is front view of a lollipop constructed in accordance with the principles of the present invention, with the wrapper removed;

FIG. 2 is a side view, partly in section of the lollipop of FIG. 1;

FIG. 3 is a diagrammatic view in section of the machine for wrapping the lollipops;

FIG. 4 is an enlarged perspective of one of the die members employed in the wrapping operation;

FIG. 5 is a front view of a pair of wrapped lollipops prior to the severance of the wrapping therebetween, and FIG. 6 is an enlarged diagrammatic view showing the relationship between the handle and its die chamber.

Referring more particularly to FIGS. 1 and 2, a lollipop 10 constructed in accordance with the present invention is illustrated therein with the wrapper removed, and as comprising a confection 12 supported by a handle 14, the latter being formed in any suitable manner by a plurality of plies of cellophane or other heat sealable plastic material or by an extruded plastic material to provide a hollow tubular handle. As is well known in the art, the handle 14 may be projected or pushed into the confection 12 while the latter is still in a plastic condition, and the stiffness of the handle material is such that this operation is readily effected without bending or fracture thereof, and as shown, a portion 16 of the confection 12 is forced into the hollow end of the handle 14 during this operation, thus providing a secure bond between the handle and confection when the latter cools.

One of the important features of the invention resides in the provision of a weakened area 18 in the handle 14 located immediately below the confection 12, such weakened area being formed during the wrapping operation to be described hereinafter in detail. Such weakened area 18 is secured by compressing opposite sides of the wall of the handle together to provide a flattened section, as shown in FIG. 1, which section is reduced in thickness, as shown in FIG. 2, and is formed with a plurality of parallel flutes or corrugations 20. This construction provides an unusually effective safety handle arrangement, it being understood that the application of a relatively slight endwise pressure to the lollipop 10 will cause the handle 14 to bend or flex at the weakened area 18 as shown in dotted lines in FIG. 2. Even with the incorporation of the weakened area 18 however, the handle 14 is still sufficiently rigid to support the confection 12 in an upright position for consumption in the usual manner.

After assembly of the confections and their respective handles has been effected, the lollipops 10 are individually fed in any suitable manner along a path of travel such as that shown by the arrow A in FIG. 3, to the wrapping machine, where they travel between a pair of wrapping sheets and to a pair of similar, heated continuously rotating cylindrical die members 22 and 24, each of the latter having a plurality of circumferentially spaced die cavities 26 at the periphery thereof. Such die members are rotated synchronously with the travel of the lollipops so that successive die cavities 26 are brought successively into registry to define enclosed die cavities which are larger than but generally conform to the size and shape of the confections 12.

As shown in FIG. 3, strips 28 and 30 of cellophane tape or other heat sealable material are drawn from suitable sources of supply and envelope opposite sides of the confections 12 during operation of the wrapping machine. It will be understood that during such operation, each confection is carried into a die cavity 26 and that the opposed edges of the strips of wrapping material surrounding the confection are heat sealed by the opposed heated surfaces 32, 34, 36 and 38 of the die members 22 and 24.

In order to form the weakened areas 18 in the lollipop handles 14 during the wrapping operation, each of the die members 22 and 24 is provided with a plurality of suitably shaped die cavities 40 for receiving a portion of the handle of each lollipop. It will be understood that the die cavities 40 are positioned substantially on the center lines of the cavities 26 and that the cavities 40 in the respective die members 22 and 24 are brought successively into registry with each other to form a die recess or chamber 41. As shown, the walls of the cavities 40 are fluted or corrugated at 42 and the cavities and the resultant die chamber 41 are shaped as shown in FIGS. 4 and 6 to provide the flattened section having the parallel flutes or corrugations 20 as shown in FIGS. 1 and 2.

Preferably, the heated parts 32, 34, 36 and 38 of each die member 22 and 24 are provided with interengaging flutes or corrugations 44 in order to more effectively adhesively secure the tapes 28 and 30 to each other to provide the heat sealed wrapper 46 which completely surrounds the confections 12 as shown in FIG. 5. It is pointed out that following the wrapping operation, the wrapper 46 may be cut along the line 48 by any suitable means, in order to isolate the respective wrapped lollipops.

While it is preferred that the handles 14 be tubular and formed of cellophane or other heat sealable plastic material, it will be understood that the handles may be rod-like and of solid cross section and formed from paper or plastic material. In such latter event, the weakened areas 18 will be formed in the rod-like handles in the same manner as heretofore described. It will be also understood that if desired, only one set of corrugations 20 may be provided on one wall of the handle while the opposite wall remains smooth. This may be readily achieved by making one of the die cavities 40 in the die member 22 of smooth contour while the mating die cavity 40 of the die member 24 is fluted as at 42.

From the foregoing, it will be readily seen that the present invention provides a novel method and apparatus for simultaneously wrapping lollipops and for imparting a safety feature to the handles thereof. The arrangement is such that the weakened and corrugated safety areas are formed during the wrapping operation and after the handles have been projected into the relatively soft and plastic confections. In this manner, the full and complete rigidity of the handles is utilized during the making of the lollipops, thus avoiding any danger of the hollow, tubular and relatively thin-walled handles from bending or buckling during assembly of the handles and confections. The final product comprises a lollipop having a heat sealed wrapper which is preferably of a heat sealed transparent type completely enveloping the confection, the handle being formed with a slightly flattened, corrugated or fluted safety area such that the handle is sufficiently rigid to hold the confection in an upright manner for consumption of the latter, but is capable of flexing or bending upon the application of a relatively slight endwise pressure thereto.

While one embodiment of the invention has been shown and described herein with considerable particularity, it will be understood by those skilled in the art that various changes may be made therein without departing from the spirit of the invention. Reference will therefore be had to the appended claims for a definition of the limits of the invention.

What is claimed is:

1. A safety lollipop comprising a confection provided with a hollow tubular handle having one end thereof embedded therein, said confection being provided with a wrapper, said handle having a flattened, weakened and corrugated area immediately below the confection, said area comprising corrugations on opposite walls of the handle arranged in a direction transverse to the axis of the handle so that the handle will bend upon the application of a relatively slight endwise pressure to the lollipop, and said wrapper comprising a pair of plastic sheets adhered to each other to completely envelop the confection and said weakened area.

2. A safety lollipop comprising a confection and a hollow tubular handle of plastic material, said handle having a continuous outer surface throughout its length, one end of said handle being embedded in the confection, and said handle having a weakened, flattened and corrugated area below the confection, said area including a plurality of parallel corrugations on opposed walls of the handle arranged in a direction transverse to the axis of the handle, said area having a width in excess of the diameter of the handle and a thickness less than said diameter said weakened area enabling bending of the handle upon the application of a relatively slight endwise pressure to the lollipop.

3. A safety lollipop as set forth in claim 2 which includes a wrapper for said confection, said wrapper comprising a pair of plastic sheets adhered to each other to completely envelop the confection and said weakened area.

References Cited by the Examiner

UNITED STATES PATENTS

| | | | |
|---|---|---|---|
| 1,847,415 | 3/1932 | Snell | 99—138 |
| 1,929,906 | 10/1933 | Skokowski | 99—138.5 |
| 1,980,588 | 11/1934 | Hopp | 99—138.5 |
| 2,113,575 | 4/1938 | Decker | 99—138.5 |
| 2,211,197 | 8/1940 | Cahoon | 99—138 |
| 2,246,778 | 6/1941 | Cahoon | 99—138.5 |
| 2,363,503 | 11/1944 | Decker | 99—138.5 |
| 2,486,758 | 11/1949 | Pfieffer | 53—28 |
| 2,737,764 | 3/1956 | Lewis | 53—28 |

RAYMOND N. JONES, *Acting Primary Examiner.*

TRAVIS S. McGEHEE, A. LOUIS MONACELL, A. E. FOURNIER, *Examiners.*